Patented Oct. 27, 1931

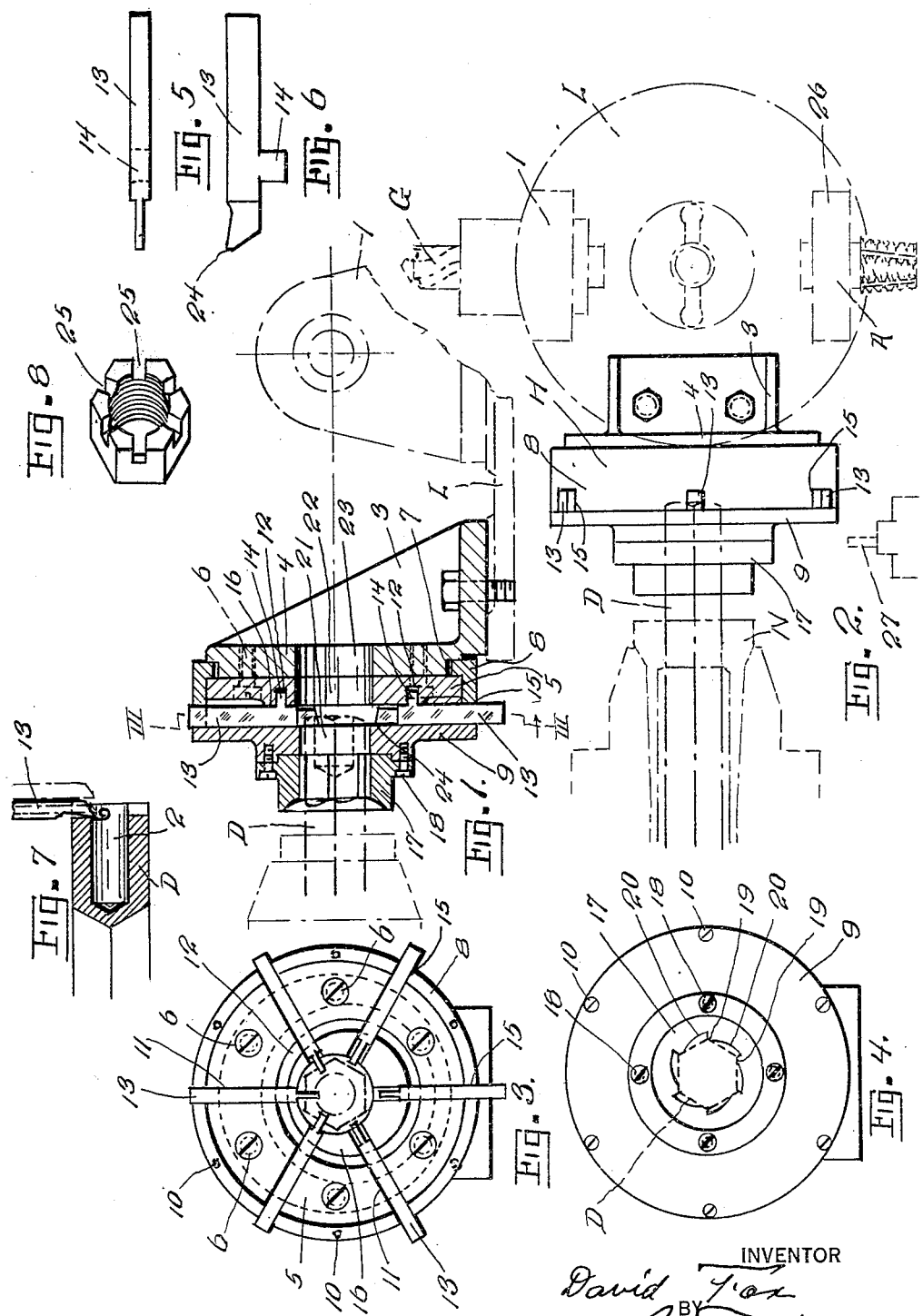

1,829,215

UNITED STATES PATENT OFFICE

DAVID FOX, OF BRONX, NEW YORK

METHOD AND MEANS FOR PRODUCING CASTELLATED NUTS AND THE LIKE

Application filed March 10, 1927. Serial No. 174,123.

This invention relates to method and means for producing castellated nuts and the like.

An object of the invention is to provide a new and improved method in accordance with which castellated nuts and the like may be quickly and accurately produced.

A further object is to provide a simple, substantial and practical mechanism by which to perform the steps of the improved method referred to.

A more detailed object is to provide a mechanism by which the several slots of the nut may be produced substantially simultaneously.

A further detailed object is to construct the mechanism so that it is adapted to be moved longitudinally of a piece of rod stock and so that it will operate to cut the several slots in the end of the stock as it advances.

A further detailed object is to so construct the mechanism that it may be mounted as one of the tools upon the turret of an ordinary turret lathe, the other tools upon said turret being a drill by which to form the central hole and a tap by which to thread said central hole.

A further detailed object is to provide a turret lathe comprising a drill, a castellating mechanism, a tap, and a cut-off device, all arranged for successive operations upon the end of a piece of rod stock during relative rotation of said stock, thereby to produce a complete castellated nut from the end portion of said stock.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawings which are to be taken as a part of this specification, and in which I have shown merely a preferred form of embodiment of the invention:—

Fig. 1 is a vertical central sectional view through a castellating mechanism constructed in accordance with this invention and showing by dotted lines parts of the adjacent lathe structure, including the bar stock from which castellated nuts are to be formed and cut.

Fig. 2 is a top plan view of the structure seen in Fig. 1, the adjacent lathe parts and the stock being here also shown in dotted lines.

Fig. 3 is a transverse sectional view taken upon the plane of line III—III of Fig. 1.

Fig. 4 is an end view of the structure seen in Fig. 1 as viewed from the left hand side of said Fig. 1.

Figs. 5 and 6 are plan and side views respectively of one of the cutter tools employed.

Fig. 7 is a fragmentary detail view showing in section the end portion of the stock as it appears after being drilled and while the castellating slots are being cut across the end thereof, and Fig. 8 is a perspective view of one of the finished castellated nuts which the mechanism disclosed herein is adapted to produce.

Referring to the drawings for describing in detail the structure therein illustrated the reference character L indicates the main base plate of a lathe turret. At properly space intervals circumferentially of this plate are mounted the several tools which are to operate upon the end of the bar stock. An appropriate drill as G is arranged at one point. A castellating mechanism H is arranged spaced circumferentially from the drill G, and a tap A is arranged spaced circumferentially from the castellating mechanism.

A suitable chuck device N is provided for supporting the bar stock D in an appropriate and well known manner so that the end of the bar stock projects a suitable distance beyond the chuck and is thereby adapted to be operated upon by the several tools of the turret.

It will be understood that the chuck device, and the turret, are all carried upon an appropriate form of lathe bed, not illustrated, and that the base plate L is adapted to be stepped around to bring the tools thereof into proper co-operative relation with the stock by means well known and hence not here illustrated.

It will also be understood that the lathe includes any appropriate means by which to continuously, or otherwise, rotate the bar stock D, and also that the turret is adapted to be moved longitudinally along the lathe bed toward and away from the end of the bar stock in the usual manner common to turret lathes.

The drill G is preferably stationary upon a suitable standard as 1 carried by the base plate L. When the turret is in position presenting the drill to the end of the bar stock movement of the turret to press the end of the drill against the end of the bar stock while said stock is rotating will result in the drilling of a hole as 2 in the end of said bar stock.

The castellating mechanism H illustrated consists of a standard 3 which is formed or fixed rigidly with the base plate L spaced from the drill standard 1. This standard provides a vertical wall part 4 to the face of which is fixed a separately formed cam plate 5 which is preferably detachably fixed to said wall 4 by means of a series of bolts or screws 6—6. The wall 4 and the cam plate are both of circular contour and are formed to provide an annular peripheral groove, as 7, between them.

Rotatably engaging within the groove 7 is a ring 8 and fixed to said ring is a cover plate 9, the latter being preferably detachably connected to said ring by means of a series of bolts or screws as 10—10.

The cover plate 9 is formed with a series of radial slots as 11—11 in the surface thereof facing toward the cam plate 5, and said cam plate is formed with an eccentric groove 12 traversing all of the slots 11.

Fitting into each slot 11, and slidable therealong radially of the cover plate, is a cutter as 13, and each of these cutters, one of which is shown in detail in Figs. 5 and 6, has a lug or extending portion 14 projecting into the eccentric groove 12, from which it will be apparent that the rotation of the cover plate, and of the cutters carried thereby will cause the cutters to be slid back and forth along their respective slots 11.

The cutters may be of any length but in order to obtain ample bearing for their outer ends they preferably extend through openings as 15 provided to receive them through the ring 8.

The inner ends of the cutters are engaged by the annular surface portion 16 of the cam plate 5 and are thus held and guided within their respective slots 11.

Connected with the cover plate 9 is a stock engaging collar 17, said collar being preferably detachably connected with the plate 9 as by means of bolts or screws 18—18. Internally of this collar is formed a series of abutments 19 arranged to engage the bar stock D and cause the collar, and hence the cover plate 9 and the cutters, to rotate with the bar stock.

Intermediate the abutments 19 the inner surface of the collar is cut away as at 20—20 so as thereby to enable the abutments to more accurately and properly engage the angular corner parts of the bar stock, which it will be here noted is of hexagonal cross section.

The cover plate 9, the cam plate 5, and the wall 4, are all provided with central openings therethrough as 21, 22 and 23 respectively said openings being aligned with the central opening of the collar 17 so that the bar stock, and the completed nuts may move therethrough.

In utilizing this tool, after the bar stock has been operated upon by the drill G and said drill withdrawn, the turret plate L is rotated to bring the castellating mechanism in line with the stock. The mechanism is then moved forward along the lathe bed so as to telescope over the projecting end of the stock, the abutments 19 meanwhile engaging against the corners of the stock and causing the cutters to swing around with the stock and to slide radially in and out along their respective slots 11. It will be understood of course that the abutments 19 are so arranged as to hold the stock in such relation to the cutters that the cutters will occupy their proper positions relative to the flat surfaces of the stock, there being of course one cutter for each flat surface, or in the usual standard practice there will be six cutters.

The inner end portions of the cutters are each properly formed to provide cutting edges as 24 of appropriate width and shape and in just the right position to traverse back and forth across the adjacent end edge portion of the stock, after the manner of an ordinary planer tool. As the turret moves forward the repeated in and out movements of the cutters will cause each cutter to plane away the material of the stock to form one of the slots, as 25 in the finished nut.

Each cutter operates upon a single slot 25 until all of the slots are completed, whereupon the turret is slid backwardly to disengage the castellating mechanism off of the end of the stock, and the turret is then rotated to bring the tap A in position for operating upon the stock.

The tap A is preferably mounted stationary upon a suitable standard 26 carried at a proper point upon the base plate L and when said plate has been rotated to bring the tap into alignment with the stock the turret is moved forward again to drive the tap into the hole 2 previously made within the stock, the continued rotation of the stock being effective to cause formation of threads within said hole by means of the tap.

When the hole has been properly threaded the tap is withdrawn, either by counter-rotation of the stock or by appropriate rotation of the tap.

The formation of the nut upon the end of the stock being now completed, except for severance of the nut from the remainder of the stock, and the turret having been moved backwardly to free the end portion of the stock, a suitable cut-off tool as 27 is moved to position against the side of the stock and as the stock continues to rotate said tool operates to sever the completed nut.

The tool 27 is preferably carried by the lathe bed and is operated back and forth against the stock in a manner well understood and requiring no further description here.

After the completed nut has been removed from the end of the stock the stock is fed through the chuck to bring another portion of its length into position to be operated upon by the tools as described, and the operation is repeated so that a completed castellated nut is turned out one for each cycle of operation of the tools referred to.

A purpose of having the several parts of the castellating mechanism detachably connected as already described is to facilitate their easy separation and the reassembly of parts varying in size and proportions. Larger and heavier cutters may be employed for the making of heavier castellated nuts, and a heavier cam plate, differently proportioned cover plate, and a different size of abutment-carrying collar may be attached. Or if a cutter, or in fact any part of the mechanism, becomes broken, damaged or worn, it may be readily removed and a fresh part substituted.

The mechanism is strong and efficient and yet simple, substantial and practical. The castellating of a nut is performed by simply advancing the castellating mechanism over the end of the bar stock in the same manner as any ordinary cutter, drill or other tool would be advanced by means of the lathe turret, and the operation is quickly and accurately performed in every instance.

While the castellating mechanism is here shown as being an element mounted upon a turret for performing its operation as one of a cycle of operations performed by the various tools of the turret, it is to be understood however that the invention is not necessarily limited in this regard as obviously the castellating mechanism may be utilized independently of the presence of a turret, or of a drill, or of a tap, or of any other tools in the same lathe.

As many changes could be made in this construction without departing from the scope of the invention as defined in the following claims, it is intended that all matter contained in the above description or shown in the accompanying drawings, shall be interpreted as illustrative only and not in a limiting sense.

Having thus described my invention, what I claim as new and desire to secure by Letters Patent is:—

1. Means for castellating the end of a piece of rotating bar stock, said means comprising a plurality of cutters, a carrier for said cutters arranged to engage the bar stock to rotate therewith and to thereby rotate the cutters with the bar stock, and means whereby rotation of the cutters will cause the cutters to move with respect to the stock and to each thereby cut a groove in the stock.

2. Means for castellating the end of a piece of rotating bar stock, said means comprising a plurality of cutters, a carrier for said cutters arranged to engage the bar stock to rotate therewith and to thereby rotate the cutters with the bar stock, and a non-rotating cam arranged to be engaged by the rotating cutters effective to move the cutters with respect to the stock whereby each cutter will cut a single slot in the stock.

3. Means for castellating the end of a piece of stock, said means comprising a carrier having an opening therethrough within which the stock may be positioned, a plurality of cutters carried by said carrier arranged to move into and out of said opening to thereby operate upon the stock within said opening, means to hold the stock against relative rotary movement within said opening and to thereby insure operation of each cutter upon a given portion of the stock, a cam arranged to engage said cutters, and there being means whereby the cam will operate to cause the cutters to move into and out of said opening.

4. Means for castellating the end of a piece of rotating bar stock, said means comprising a standard, a cam plate carried by said standard, said standard and said cam plate each having an opening through which the bar stock may extend, a cover plate rotatably mounted upon said standard having an opening aligned with the mentioned openings also to receive the stock therethrough, means by which said cover plate may be connected with the bar stock to rotate therewith, a plurality of cutters carried by said cover plate to rotate therewith each having a cutter portion arranged to extend into said opening for operating upon the bar stock, a cam slot provided in said cam plate eccentric to said mentioned openings, and each of said cutters having a lug engaging within said cam slot to thereby drive the cutters during rotation thereof with respect to the cam plate.

5. The herein described method of producing castellated nuts, which method consists in providing a piece of rotating stock, drilling a hole into said stock while said stock is rotating, castellating said stock around said hole while the stock continues to rotate, and then threading said hole.

6. A castellating mechanism comprising a plurality of radially arranged cutters, a carrier for said cutters, means for holding a piece of stock in position at the centre of said cutters collectively and for rotating the carrier and stock, and means to simultaneously operate all of said cutters for thereby operating upon said rotating stock.

7. A castellating mechanism comprising a plurality of radially arranged cutters, a carrier for said cutters, means for holding a piece of stock in position at the centre of said cutters collectively and for rotating the carrier and stock, and means by which to cause the cutters each to cut a separate groove in the rotating stock.

8. The herein described method of producing castellated nuts, which method consists in providing a piece of rotating bar stock moving said stock endwise a distance corresponding substantially to the thickness desired for the nut, drilling a hole lengthwise into said stock, of a depth of at least as great as the distance of movement of the stock, castellating the end of the stock around said hole while the stock is rotating, threading said hole, and severing from the stock the castellated and threaded portion of a thickness corresponding to the amount of endwise movement of the stock.

In testimony whereof I affix my signature.

DAVID FOX.